United States Patent Office 2,884,395
Patented Apr. 28, 1959

2,884,395

QUATERNARY AMMONIUM HYDROXIDE STABILIZED CATIONIC AMINO-FORMALDEHYDE SOLUTION AND PROCESS FOR MAKING SAME

Henry P. Wohnsiedler, Darien, Conn., assignor to American Cyanamid Company, New York, N.Y., a corporation of Maine No Drawing. Application August 1, 1955
Serial No. 525,780

13 Claims. (Cl. 260—29.4)

This invention relates to stabilized acidic colloidal solutions of melamine-formaldehyde and melamine-urea-formaldehyde resins and to the process of preparing the same. More particularly, this invention relates to a process of stabilizing acidic colloidal solutions of melamine-formaldehyde and melamine-urea-formaldehyde resins by the addition thereto of a quaternary ammonium base such as quaternary alkanol ammonium bases and quaternary benzyl ammonium bases and to the product thus produced.

One of the objects of the present invention is to produce an acidic colloidal solution of an aminotriazine-formaldehyde resin such as a melamine-formaldehyde resin which has been stabilized against gelation by the addition thereto of a quaternary ammonium base. A further object of the present invention is to produce a stabilized complex of an acidic colloidal solution of a melamine-formaldehyde resin such complex being in the form of a polyelectrolyte by the addition thereto of quaternary alkanol ammonium bases and/or quaternary benzyl ammonium bases wherein the resin solution has been rendered colloidal by the addition thereto of hydrochloric acid. These and other objects of the present invention will be discussed in greater detail hereinbelow.

Melamine per se, namely 2,4,6-triamino-1,3,5-triazine and melamine in combination with urea may be reacted with formaldehyde to produce condensation products used in the present invention. When these condensation products are prepared in the presence of definite quantities of free hydrochloric acid or subsequently reacted with these same quantities of acid after their preparation by other conventional methods they are converted into colloidal solutions wherein a positive charge is carried by the dispersed particles of the resin. In this condition, the resin solutions or colloidal dispersions exhibit several unusual properties of commercial importance and particularly the property of migration of resin particles toward the cathode upon electrophoresis of the dispersion. The colloidal solutions or dispersions of these cationic aminotriazine-formaldehyde resins may be produced by conventional methods such as those disclosed in the U.S. Patent 2,345,543, issued March 28, 1944, and U.S. Patents 2,485,079 and 2,485,080, issued October 18, 1949. There are first prepared condensation products or resins of a particular type which are defined hereinafter as "acid-type" resins or condensation products. The "acid-type" melamine-formaldehyde and melamine-urea-formaldehyde condensation products are readily identified by the following characteristics:

(1) When freshly prepared, they form clear solutions in both water and acids;

(2) The clear, aqueous solutions are converted upon aging, first to hydrophilic colloids, then to a water-dispersible gel stage and finally upon drying to a water-insoluble resin.

(3) In the case of melamine-formaldehyde condensation products, the composition contains from 2–2.5 mols of combined formaldehyde for each mol of melamine. In the formaldehyde condensation products of melamine in combination with urea, about 1 to 4 mols of formaldehyde per mol of melamine+urea are required. In the preparation of the acid-type melamine-formaldehyde resin solution or acid-colloid, larger amounts of acid than the catalytic amounts generally used for inducing condensation of a neutral or slightly alkaline condensation product are used. Thus, a stoichiometric equivalent of hydrochloric acid per equivalent of melamine in the composition is frequently a suitable amount. The proportion of urea to melamine can be varied over fairly wide limits in acid colloids prepared from a combination of the two. The maximum proportion of urea, however, is in the order of 70 mol percent urea with 30 mol percent of melamine.

(4) The pH of a 15% aqueous solution of acid-type melamine-formaldehyde resin is always less than 4 and is usually below 3.

Optimum pH values and acid ratios for hydrochloric acid are shown in the following example in which all parts are parts by weight. This and other examples set forth hereinbelow are introduced primarily for the purpose of illustration and any specific enumeration of detail contained therein should not be interpreted as a limitation on the invention except as is indicated in the appended claims.

EXAMPLE 1

A methylol melamine having a mol ratio of formaldehyde to melamine of 3.33:1 is prepared by heating together 3 mols of melamine with 10 mols of a 30% aqueous solution of formaldehyde having a pH of about 9 for about 30 minutes, cooling, separating and drying the resulting crystalline product. Upon the addition thereto of relatively small amounts of hydrochloric acid to a solution thereof, a precipitate of a white, amorphous resin occurs, and this condition persists until a pH of about 3.5 is obtained corresponding to about 0.5 mol of hydrochloric acid. A transition zone is reached next, where cloudy solutions setting to cloudy or opaque gel-like resins are obtained, particularly upon long standing. With a slightly increased acid content to a pH below 3.5 with another aqueous solution of the crystalline methylol melamine, the product is a clear solution which passes on aging into a blue colloidal solution and then to a clear bluish, water-dispersible gel which can be redispersed to a positively charged, colloidal solution by dilution with water and continued agitation. These gels, however, finally become undispersible upon continued aging and set to clear, insoluble resins on drying. Further increases in acid result in the formation of clear solutions which pass through the stage of partial polymerization wherein the resin is positively charged, but finally form white opaque gels after standing for several days. With a large excess of acid on the order of three or more mols of hydrochloric acid, a 2 phase system is encountered (containing liquid together with amorphous precipitate), which is quite similar to those observed with insufficient acid.

The amount of hydrochloric acid which is used in the preparation of these acid colloids may be varied between about 0.7 mol and 1.3 mols per mol of melamine. The optimum pH of a 15% solids solution is about 1.5.

For use in the pulp beater in the manufacture of wet strength paper, a suitable concentration of dissolved material is on the order of 10–15%. This permits the degree of polymerization of the resin to be taken to the optimum point so that the colloid will retain its activity over a reasonably long period for normal use and not age to the gel point prematurely. However, acid-type resins or acid colloids can be made at a higher concentration such as 40 or 50% and this is only limited by the strength of the starting materials. For the preparation of the stabilized acid colloids which is the subject of this invention, the acid colloids are preferably prepared at these higher concentrations and this will be illustrated in the examples which follow.

The addition of the stabilizing quaternary ammonium base to the acid resin solution or colloid is made after the latter has reacted for a certain period. If the time interval required for an acid colloid to reach the gel point under a given set of conditions such as concentration and temperature be determined, this can be designated as the normal life of this colloid. A colloid prepared identically and having a fractional life can then be designated as a ¼, ½ or ¾ stage colloid, for example, depending on the degree of reaction through which it has been taken. For stabilization purposes, acid colloids are preferably taken beyond the ¼ stage. At this stage, sodium hydroxide will normally precipitate about 95% of the melamine as condensation product. A hydrochloric acid solution of a melamine-formaldehyde condensation product will produce no precipitate with sodium hydroxide when neutralized immediately after the solution has been prepared. It can, therefore, be considered that at the ¼ stage 95% of the reaction product is polymerized in the typically acid colloid form.

Ordinarily the amount of quaternary ammonium base required for stabilization will be equivalent to the amount of hydrochloric acid used in the preparation of the acid colloid. A lower proportion of base will lead to instability. To insure an adequate amount of base, a 5 to 10% excess is preferably added.

EXAMPLE 2

108 parts of trimethylol melamine (0.5 mol) are reacted with 49.5 parts of concentrated hydrochloric acid (0.5 mol) in 95 parts of water and a 50% solids solution for 4 hours at room temperature. To 25.3 parts of the above acid colloid, equivalent to 0.05 mol of melamine, there is added 27.8 parts of a 41% aqueous solution of tetraethanol ammonium hydroxide (0.55 mol). The two components were mixed readily and formed a perfectly clear solution with a glass electrode pH value of 9.7. The solution thus prepared was miscible with ethylene glycol methyl ether whereas acetone caused separation of a liquid layer. The solution also tolerated several volumes of water before precipitating.

The normal life of the acid colloid used in the foregoing preparation was 7–10 hours. At the time, it was neutralized with the quaternary ammonium base it was, therefore, at about the ½ stage. In contrast with sodium hydroxide which when added as neutralizing agent produced a bulky gelatinous precipitate the quaternary ammonium base produced a clear solution which remained unchanged over more than five months.

EXAMPLE 3

Part A 54 parts of trimethylol melamine (0.25 mol) and 24.8 parts of hydrochloric acid (0.25 mol) are mixed and the solution is stirred at room temperature (25–33°) for 2½ hours to permit reaction to take place. 25.3 parts of this solution, equivalent to .05 mol of melamine, are introduced into a suitable reaction vessel and there is added thereto 13.3 parts of a 50% methyl alcohol solution of β-hydroxyethyl trimethyl ammonium hydroxide (.055 mol). The mixture now alkaline to thymol blue in the form of a creamy consistency due to precipitation was stirred for several minutes to insure homogeneity. 24 parts of ethylene glycol methyl ether were then introduced and this dissolved the precipitate with formation of a stable, clear solution.

Part B

By comparison with the above to 12.7 parts of the acid colloid there was added 2.2 parts of 50% sodium hydroxide solution with formation of a creamy precipitate, the mixture being alkaline to thymol blue. 12.7 parts of ethylene glycol methyl ether when added brought about some resolution but after about one half hour, the precipitate reappeared and further addition of the ether alcohol solvent was without effect. A film was cast from the solution of Part A by drying at 60° for 2 hours. This was clear and continuous. Contact with boiling water softened the film somewhat but on the whole it appeared quite water resistant.

EXAMPLE 4

A neutralized acid colloid was prepared according to the procedure of Example 2. It was then concentrated by heating at 44° C., under reduced pressure, 500 parts of original product yielding 310 parts of a syrupy liquid. Its pH value was 10.4 and calculated solids concentration 77%. When further dried in Petri dishes at 50° C. over a 5 hour period, the residue assumed the form of a pourable but viscous, transparent resin similar in appearance to balsam and after 2½ hours at 105° C., it became a firm moldable semisolid.

EXAMPLE 5

216 parts of trimethylol melamine, 98.5 parts concentrated hydrochloric acid and 404 parts of water were mixed and heated at 50° over 39 minutes for a ½ stage colloid. To 359 parts of this acid colloid having 35% concentration, 226 parts of a 40% aqueous solution of benzyl trimethyl ammonium hydroxide were added while stirring with an agitator. The product was in the form of a low viscosity liquid dispersion. When dried in a Petri dish at 105°, 2½ hours, it assumed the form of a translucent, hard, brittle film. In a 15 minute boil test only 32% of the nitrogen was extracted indicating some degree of cure had taken place.

EXAMPLE 6

A copolymer composition of melamine and urea was prepared by reacting 12 parts of urea, 38 parts of melamine and 105 parts of aqueous formaldehyde containing 37% by weight of formaldehyde. Reaction was effected by heating at 80° for a period of 15 minutes and then cooling. The product at this point was a viscous syrup which tolerated dilution with water to a concentration of 15% solids.

To this syrup 65 parts of water were added followed by 30.5 parts of concentrated hydrochloric acid resulting in a concentration of non-aqueous components of 40%. This acid form of the resin was miscible with water. It was aged at 8–20° C. and in the course of this aging, various bases were added to test portions. In each case, the base was added in an amount which was equivalent to the hydrochloric acid originally added and therefore sufficient to bring the pH value to about 9–10. After 18 minutes in the acid form, the addition of NaOH caused precipitation of resin which remained insoluble upon the addition of methanol whereas tetraethanol ammonium hydroxide precipitated only a small amount of resin which dissolved with added methanol. After 3 hours, sodium hydroxide precipitated a bulky resinous mass insoluble in ethylene glycol methyl ether whereas the quaternary base precipitated some finely divided solids which redissolved with added glycol ether. In this case to 42 parts of the acid form, 26 parts of 41% tetraethanol ammonium hydroxide had been added and this was followed by 24 parts of the ether. This composition could be cast in film form by baking at temperatures of 60–100°.

Amongst the quaternary ammonium bases which may be used to stabilize the acid colloid resin solutions of the present invention are the quaternary alkanol ammonium bases and quaternary benzyl ammonium bases. Representative of the former are β hydroxy ethyl trimethyl ammonium hydroxide; tris (β hydroxy ethyl) methyl ammonium hydroxide; tris (β hydroxy ethyl) ethyl ammonium hydroxide; tris (β hydroxy ethyl) butyl ammonium hydroxide; tris (β hydroxy ethyl) amyl ammonium hydroxide; tris (β hydroxy ethyl) hexyl ammonium hydroxide; tetrakis (β hydroxy ethyl) ammonium hydroxide; γ hydroxy propyl trimethyl ammonium hydroxide; bis (β hydroxy propyl) diethyl ammonium hydroxide; tris (γ hydroxy propyl) butyl ammonium hydroxide; bis (γ hydroxy propyl) diamyl ammonium hydroxide; tetrakis γ hydroxy propyl trihexyl ammonium hydroxide; tetrakis (γ hydroxy propyl) ammonium hydroxide; tetrakis (4-hydroxy butyl) ammonium hydroxide; 4-hydroxy butyl trimethyl ammonium hydroxide; tris (γ hydroxy butyl) hexyl ammonium hydroxide; tris (5-hydroxy pentyl) methyl ammonium hydroxide; 5-hydroxy pentyl tributyl ammonium hydroxide; bis (5-hydroxy pentyl) dihexyl ammonium hydroxide; tetrakis (5-hydroxy pentyl) ammonium hydroxide; 6-hydroxy hexyl, triethyl ammonium hydroxide; bis (3-hydroxy hexyl) diamyl ammonium hydroxide; tetrakis (6-hydroxy hexyl) ammonium hydroxide and the like.

Amongst the quaternary benzyl ammonium bases which may be used in the present invention are benzyl trimethyl ammonium hydroxide; tribenzyl methyl ammonium hydroxide; tetrabenzyl ammonium hydroxide; dibenzyl dibutyl ammonium hydroxide; benzyl tripropyl ammonium hydroxide; benzyl triamyl ammonium hydroxide; tribenzyl hexyl ammonium hydroxide, and the like. These quaternary ammonium bases may be used either singly or in combination with one another.

One of the purposes served by the present group of new compositions in the stabilization of acid colloids by converting them to a neutralized form after they have been brought to the desired degree of reaction. In this form, they are highly stable and since they may be prepared in the form of highly concentrated solutions they are well adapted for transport and shipment. Thus they represent a new form of the melamine and melamine-urea acid colloids in which the latter are made available for use at the paper mill or other place of use, thereby eliminating the need for preparing the resin solution at the site. By the addition of acid, the acid form of the colloid may be regenerated and used directly.

In view of the unique properties of these new resinous materials, other uses are suggested. They may be used as catalysts for promoting chemical reactions or for their bactericidal properties in combination with their property of curability in film form. They may also be used as surface active agents or in view of their highly active molecular form they may be combined with other chemical reactants such as ethylene oxide. Furthermore, they may be used as protective colloids in conditioning clays in the ceramic industry or in electroplating solutions or they may be used in combination with other synthetic resins for special purposes as in textile finishing.

In the above examples, all temperatures given are in degrees centigrade.

I claim:
1. A stable colloidal aqueous solution of a partially polymerized reaction product of melamine and formaldehyde wherein the mol ratio of formaldehyde to melamine is from about 2:1 to 3.3:1 respectively, and wherein said solution is rendered colloidal by the addition of and reaction with from about 0.7 to 1.3 mols of hydrochloric acid for each mol of melamine and then neutralized with a material selected from the group consisting of quaternary alkanol ammonium hydroxides and quaternary benzyl ammonium hydroxides on the basis of at least 1 equivalent of said material per mol of hydrochloric acid contained in said reaction product.

2. A stable colloidal aqueous solution of a partially polymerized reaction product of melamine and formaldehyde wherein the mol ratio of formaldehyde to melamine is from about 2:1 to 3.3:1 respectively, and wherein said solution is rendered colloidal by the addition of and reaction with from 0.7 to 1.3 mols of hydrochloric acid for each mol of melamine and then neutralized with a quaternary alkanol ammonium hydroxide on the basis of at least 1 equivalent of said hydroxide per mol of hydrochloric acid contained in said reaction product.

3. A stable colloidal aqueous solution of a partially polymerized reaction product of melamine and formaldehyde wherein the mol ratio of formaldehyde to melamine is from about 2:1 to 3.3:1 respectively, and wherein said solution is rendered colloidal by the addition of and reaction with from 0.7 to 1.3 mols of hydrochloric acid for each mol of melamine and then neutralized with a quaternary benzyl ammonium hydroxide on the basis of at least 1 equivalent of said hydroxide per mol of hydrochloric acid contained in said reaction product.

4. A stable colloidal aqueous solution of a partially polymerized reaction product of melamine and formaldehyde wherein the mol ratio of formaldehyde to melamine is from about 2:1 to 3.3:1 respectively, and wherein said solution is rendered colloidal by the addition of and reaction with from 0.7 to 1.3 mols of hydrochloric acid for each mol of melamine and then neutralized with at least 1 equivalent of tetraethanol ammonium hydroxide per mol of hydrochloric acid contained in said reaction product.

5. A stable colloial aqueous solution of a partially polymerized reaction product of melamine and formaldehyde wherein the mol ratio of formaldehyde to melamine is from about 2:1 to 3.3:1 respectively, and wherein said solution is rendered colloidal by the addition of and reaction with from 0.7 to 1.3 mols of hydrochloric acid for each mol of melamine and then neutralized with at least 1 equivalent of trimethyl beta hydroxy-ethyl ammonium hydroxide per mol of hydrochloric acid contained in said reaction product.

6. A stable colloidal aqueous solution of a partially polymerized reaction product of melamine and formaldehyde wherein the mol ratio of formaldehyde to melamine is from about 2:1 to 3.3:1 respectively, and wherein said solution is rendered colloidal by the addition of and reaction with from 0.7 to 1.3 mols of hydrochloric acid for each mol of melamine and then neutralized with at least 1 equivalent of benzyl trimethyl ammonium hydroxide per mol of hydrochloric acid contained in said reaction product.

7. A stable colloidal aqueous solution of a partially polymerized reaction product of melamine, urea and formaldehyde, said reaction product having a mol ratio of formaldehyde to total mols of melamine and urea from about 1:1 to 4:1 respectively, and having a molar amount of melamine of at least 30% based on the total mols of melamine and urea, and wherein said solution is rendered colloidal by the addition of and reaction with from about 0.7 to 1.3 mols of hydrochloric acid for each mol of melamine and then neutralized with a material selected from the group consisting of quaternary alkanol ammonium hydroxides and quaternary benzyl ammonium hydroxides on the basis of at least 1 equivalent of said material per mol of hydrochloric acid contained in said reaction product.

8. A stable colloidal aqueous solution of a partially polymerized reaction product of melamine, urea and formaldehyde, said reaction product having a mol ratio of formaldehyde to total mols of melamine and urea from about 1:1 to 4:1 respectively, and having a molar amount of melamine of at least 30% based on the total mols of melamine and urea, and wherein said solution is rendered colloidal by the addition of and reaction with from about 0.7 to 1.3 mols of hydrochloric acid for each mol of melamine and then neutralized with a quaternary alkanol ammonium hydroxide on the basis of at least 1 equivalent of said hydroxide per mol of hydrochloric acid contained in said reaction product.

9. A stable colloidal aqueous solution of a partially polymerized reaction product of melamine, urea and formaldehyde, said reaction product having a mol ratio of formaldehyde to total mols of melamine and urea from about 1:1 to 4:1 respectively, and having a molar amount of melamine of at least 30% based on the total mols of melamine and urea, and wherein said solution is rendered colloidal by the addition of and reaction with from about 0.7 to 1.3 mols of hydrochloric acid for each mol of melamine and then neutralized with a quaternary benzyl ammonium hydroxide on the basis of at least 1 equivalent of said hydroxide per mol of hydrochloric acid contained in said reaction product.

10. A stable colloidal aqueous solution of a partially polymerized reaction product of melamine, urea and formaldehyde, said reaction product having a mol ratio of formaldehyde to total mols of melamine and urea from about 1:1 to 4:1 respectively, and having a molar amount of melamine of at least 30% based on the total mols of melamine and urea, and wherein said solution is rendered colloidal by the addition of and reaction with from about 0.7 to 1.3 mols of hydrochloric acid for each mol of melamine and then neutralized with at least about 1 equivalent of tetraethanol ammonium hydroxide per mol of hydrochloric acid contained in said reaction product.

11. A stable colloidal aqueous solution of a partially polymerized reaction product of melamine, urea and formaldehyde, said reaction product having a mol ratio of formaldehyde to total mols of melamine and urea from about 1:1 to 4:1 respectively, and having a molar amount of melamine of at least 30% based on the total mols of melamine and urea, and wherein said solution is rendered colloidal by the addition of and reaction with from about 0.7 to 1.3 mols of hydrochloric acid for each mol of melamine and then neutralized with at least about 1 equivalent of trimethyl beta-hydroxy-ethyl ammonium hydroxide per mol of hydrochloric acid contained in said reaction product.

12. A stable colloidal aqueous solution of a partially polymerized reaction product of melamine, urea and formaldehyde, said reaction product having a mol ratio of formaldehyde to total mols of melamine and urea from about 1:1 to 4:1 respectively, and having a molar amount of melamine of at least 30% based on the total mols of melamine and urea, and wherein said solution is rendered colloidal by the addition of and reaction with from about 0.7 to 1.3 mols of hydrochloric acid for each mol of melamine and then neutralized with at least about 1 equivalent of benzyl trimethyl ammonium hydroxide per mol of hydrochloric acid contained in said reaction product.

13. A process for preparing a stable colloidal aqueous solution of a positively charged, partially polymerized reaction product of melamine and formaldehyde containing hydrochloric acid wherein the mol ratio of formaldehyde to melamine is from about 2:1 to 3.3:1 respectively, and the mol ratio of hydrochloric acid to melamine is from about 0.7 to 1.3, which comprises adding to said colloidal aqueous solution a material selected from the group consisting of quaternary alkanol ammonium hydroxides and quaternary benzyl ammonium hydroxides on the basis of at least 1 equivalent of said material per mol of hydrochloric acid contained in said reaction product.

References Cited in the file of this patent

UNITED STATES PATENTS

| | | |
|---|---|---|
| 2,200,931 | Moore | May 14, 1940 |
| 2,345,543 | Wohnsiedler et al. | Mar. 28, 1944 |
| 2,470,363 | Mohrman | May 17, 1949 |
| 2,632,700 | Niles | Mar. 24, 1953 |
| 2,729,611 | Chesley et al. | Jan. 3, 1956 |

FOREIGN PATENTS

| | | |
|---|---|---|
| 675,477 | Great Britain | July 9, 1952 |